United States Patent [19]
Brown et al.

[11] 3,894,166
[45] July 8, 1975

[54] INTEGRAL REVERSE OSMOSIS MEMBRANE WITH HIGHLY PRESSED WOVEN FABRIC SUPPORT MEMBER

[75] Inventors: Barry M. Brown; Walter D. Slowig, both of Rochester, N.Y.

[73] Assignee: Eastman Kodak Company, Rochester, N.Y.

[22] Filed: Aug. 21, 1972

[21] Appl. No.: 282,219

[52] U.S. Cl. ............... 427/316; 427/339; 427/354; 210/500 M
[51] Int. Cl.² ....................................... B44D 1/092
[58] Field of Search .......... 210/500, 507, 490, 499; 264/216, 217; 117/47, 94, 98, 55

[56] References Cited
UNITED STATES PATENTS

| | | | |
|---|---|---|---|
| 2,333,618 | 11/1943 | Strauss | 210/499 X |
| 2,355,822 | 8/1944 | Rugeley | 210/204 |
| 2,904,828 | 9/1959 | Smith | 210/507 X |
| 2,926,104 | 2/1960 | Goetz | 264/217 X |
| 3,276,996 | 10/1966 | Lazare | 210/500 X |
| 3,429,957 | 2/1969 | Merten | 210/500 X |
| 3,524,753 | 8/1970 | Sharp | 264/216 X |

*Primary Examiner*—Frank A. Spear, Jr.
*Attorney, Agent, or Firm*—E. W. Milan

[57] ABSTRACT

An integral cellulosic reverse osmosis membrane having a permeable fabric support is made by a process which comprises casting a concentrated membrane-forming dope and forming a reverse osmosis membrane on a smooth surface of a permeable casting and membrane support fabric comprising substantially unsized continuous multiple warp and fill strands of fiber-forming crystalline organic thermoplastic resin, which fabric has been highly pressed at temperatures and pressures sufficient to smooth the surfaces of the fabric to a high degree of smoothness and sufficient to substantially completely close permanently the interstices at the strand intersections while leaving the pressed fabric permeable to the flow of a fluid such as desalinated water.

5 Claims, 5 Drawing Figures

INTEGRAL REVERSE OSMOSIS MEMBRANE WITH HIGHLY PRESSED WOVEN FABRIC SUPPORT MEMBER

BACKGROUND OF THE INVENTION

1. Field of the Invention

This invention relates to the manufacture of asymmetric cellulosic membranes having the ability to preferentially exclude dissolved salts when used in so-called "reverse osmosis" processes. Particularly, this invention relates to processes for manufacturing superthin cellulosic membranes having high flux combined with an excellent ability to preferentially exclude dissolved salts when the membranes are used in a reverse osmosis process. More particularly, the present invention relates to an improved method for preparing reverse osmosis membranes made from cellulose ester dopes and having integrally attached thereto a permeable support fabric. Still more particularly, the invention relates to a superthin form of cellulosic reverse osmosis membrane having integrally attached to it a woven form of permeable support fabric derived from an organic thermoplastic resin.

It is well known that certain asymmetric cellulosic membranes have a peculiar ability to selectively exclude from passage therethrough dissolved salts when an aqueous solution of such dissolved salts is forced under pressure against the membrane. Such selective exclusion results in purified water passing through the membrane. The processes for purifying water in this way are known as reverse osmosis processes, and such membranes are known as reverse osmosis membranes.

Cellulosic reverse osmosis membranes are made by special processes whereby a peculiar "skin" or layer of selectively effective (for preventing the passage of unwanted dissolved salts through the membrane while simultaneously permitting such passage of purified water) porosity is formed at one surface of the membrane. This skin is sometimes termed the "active" layer; the remainder of the membrane usually is very porous, with increasing porosity occurring as one proceeds in the direction through the membrane away from the "active" layer. It is apparently this special skin that endows these membranes with their valuable selective nature. In turn, the valuable selective nature of useful reverse osmosis membranes is apparently dependent upon one or more critical manufacturing process elements such as (1) the particular solvents used in the process (see U.S. Pat. Nos. 3,334,214 and 3,497,072), (2) the presence or absence of certain inorganic and organic salts in the casting dope solvent systems (see U.S. Pat. Nos. 3,133,132; 3,133,127; 3,432,584 and 3,522,335), (3) the particular way the membranes are "developed" from dopes that contain the essential materials (see the above patents and U.S. Pat. Nos. 3,592,953 and 3,432,585) and (4) even the particular treatment the resulting membranes receive after they are developed.

In general, overall processes for manufacturing useful asymmetric cellulosic reverse osmosis membranes involve the steps of:

1. casting a viscous "dope" in the form of a thin film upon an appropriate casting web (the dope or solution generally containing one or more suitable film-forming polymeric materials plus one or more special art-recognized "pore-producing" materials);

2. exposing the newly cast film of the dope to air or other suitable gaseous atmosphere for a period of at least about 15 seconds (to thereby somehow cause an incipient change in the exposed surface so that ultimately a microscopically thin active layer can be formed thereon);

3. subjecting the resulting layer to a treatment with an aqueous liquid (usually by immersion of the film in a bath containing mostly cool water) to thereby cause the dope to "gel" and thus form a membrane having sufficient integral strength to retain its physical shape and structure upon being removed from the casting web (this step is known as the initial "quench" step); and 4. subjecting the washed membrane to a special heat treatment (which step is known as the "heat tempering" step), in which the salt rejecting properties of the membrane are increased apparently because of a general shrinkage of the membrane during heat tempering.

It is known, for example, that certain polymeric film-forming materials such as cellulose esters and ethers perform optimally in such processes to manufacture commercially practical and useful reverse osmosis membranes. Also, only certain organic solvents have been found useful in such processes and apparently only a limited number of materials can function as acceptable pore-producing materials. Of the many organic solvents that have been utilized in such overall processes as those described above in the manufacture of cellulosic reverse osmosis membranes, it has been found that acetone (U.S. Pat. No. 3,344,214 and U.S. Pat. No. 3,432,585), acetic acid, formic acid, methyl formate (Dept. of Engineering, University of California at Los Angeles, Progress Report, 7-1-62 on "Sea Water Demineralization by Means of a Semipermeable Membrane" by S. Leob and U.S. Pat. No. 3,283,042) and mixtures of acetone with other solvents such as acetic acid (U.S. Pat. No. 3,522,335) and dioxane, methanol, methyl ethyl ketone, tetrachloroethane and the like (U.S. Pat. No. 3,497,072) are generally useful, with those containing acetone being preferred, possibly because of the high volatility of acetone combined with its excellent miscibility with cold water (during the initial cool water quench step of the conventional processes).

2. Description of the Prior Art

It is desirable in some units and installations where reverse osmosis membranes are to be used that the membrane be formed with, or have attached to it integrally, by formation, adhesion or other form of lamination, a support member which permits the membrane, which by itself is fragile, to be shaped into a cylindrically rolled or spiral-wound element.

If it is desired to have such a support or reinforcing member present in the membrane, which then is called an "integral membrane," such member is preferably incorporated before initial gelation occurs. The supporting member must have a porosity of permeability at least as great as that of the membrane and must have high tensile strength. As taught, for example, in U.S. Pat. No. 3,549,016, suitable incorporated prior art supporting members have been made from fibrous webs, either woven or unwoven, such as woven glass cloth as well as woven cloth of various conventional natural and synthetic textile fibers, such as cotton, linen, nylon (super polyamide), polyester (Dacron), cellulose esters and ethers, and the like. According to said patent, excellent results have also been obtained by using as the reinforcing member an unwoven fibrous web such as paper formed of any of the preceding natural or synthetic fibers. Microporous synthetic plastics or metals are also taught to be used to support or reinforce the membrane, such as sintered polyethylene or sintered stainless steel; such microporous materials preferably have apertures with a nominal diameter of 1–100 microns. In the prior art processes it is possible to deposit the layer of membraneforming solution on a casting surface first, then immerse the reinforcing member in the solution, and it is preferred first to place the reinforcing member on the casing surface, then apply the solution over the reinforcing member so that the latter becomes completely immersed.

In some processes, where the membrane is manufactured continuously, it has been found advantageous to cast the membraneforming dope directly onto a moving fabric member which serves both as a casting surface during the membrane-forming process and as a support member for the integral membrane product in its subsequent handling and use in a reverse osmosis apparatus. The support member is sometimes referred to in the prior art as a "product-water-side backing material". Such supported membranes may be assembled into plate and frame units or into spiral wound modules of reverse osmosis apparatuses for use in saline water separation plant installations. In the unit or module, the outer surface of the support member rests on or is placed against a product-channel element, or an additional productwater-side backing material through which water product is drawn off. Such units, modules, apparatuses and plants are well known and are described, for example, in "Desalination by Reverse Osmosis" by Ulrich Merten, copyright 1966 by The Massachusetts Institute of Technology, the M.I.T. Press, particularly in Chapter 7. Reverse Osmosis Pilot Plants."

Product channel elements and their design are an important consideration in design and construction of reverse osmosis apparatus, particularly in their relationship to the support member and the membrane supported thereby.

According to Research and Development Report No. 675 (1971) of the Office of Saline Water, United States Department of the Interior, the only developed materials then possessing the required geometry for product channel materials are tricot knits, preferably those which have been treated with melamineformaldehyde resin and cured. The tricot knit is a ribbed fabric in which the ribs are straight or zig-zag pattern.

A common problem with all cellulosic reverse osmosis membranes is that the size and shape of the pore structure of the support member is critical to the life of the membrane and to the uniformity of its performance in terms of salt rejection and water flux over the operative life of the membrane For example, when a woven fabric made from Dacron 601 (a polyester supplied by E.I. duPont de Nemours and Co., Inc.) is used as a support member, the ridges and valleys, and the openings at the intersections of the woven strands (hereinafter referred to as "interstices") provide areas where the membrane may rupture under the high pressures at which the reverse osmosis membrane is used. The rupturing of the membrane is most likely to occur at the interstices. The possibility of rupture is increased by intrusion of the support member into the valleys between the ribs of the product-channel material when the material is tricot knit or into the pores of the product channel material when it is a porous material.

The above-mentioned Research and Development Report No. 675, of which pages 25 through 62 are incorporated herein by reference, describes various materials which have been investigated for use as support members. Among the support member materials extensively tested and discussed in the report is a woven Dacron sailcloth manufactured by Travis Mills and identified as D-601. According to the Report, the D-601 sailcloth was used in various forms to form both leaf type and continuously cast composite membranes. For example, the D-601 was used "as-received," or was impregnated with 4 percent of melamine, or was impregnated with 5 percent of melamine-formaldehyde solution, cured at 190°C. for 1 hour, and then calendered "by passing the material through 48 inch heated rolls (350°C.) at high nip pressures." In membrane test cells, the reported treatments were found to make the support materials more impervious to water flow and to exhibit areas of localized blockage of water flow. The latter result was stated to be exhibited by as-received sized D-601 fabric and by resin-impregnated, sized D-601 fabric. Calendering was found to make the impregnated materials smoother and to increase salt rejection somewhat. However, in order to minimize the intrusion tendency of the D-601 fabric, melamine resin reinforcement of the fabric was found to be necessary. The report also states that the D-601 fabric as-received contains a sizing that is partially removed with water and is soluble in acetone (used in the dope solution). Further, it states that when the D-601 fabric was scrubbed by a commercial fabric finisher, to remove the sizing, and the scrubbed D-601 fabric then was used as a support member for a casting-solution, the latter solution completely penetrated the fabric to the drum, causing an unfortunate sequence of events. In the Report, it was concluded, therefore, that unsized D-601 sailcloth was unsuitable as a support member fabric. It was further concluded that only the D-601 fabric as-received composite gave satisfactory results in membrane test cells. However, it was further reported that the sizing in the as-received D-601 fabric makes impossible batch heat-treating of composite membrane-support fabric to improve properties of the membrane. The thickness of the membrane lying on the D-601 fabric is stated as having been from 0.003 to 0.004 inches (3 to 4 mils), and of the membrane plus the support fabric as being from 0.010 to 0.015 inches in thickness (10 to 15 mils).

SUMMARY OF THE INVENTION

It has now been found that the prior art disadvantages found in attempting to use a woven fabric, such as a fabric woven from Dacron polyester, e.g. D-601 fabric, as a support member for a semi-permeable polymeric, preferably cellulosic, film membrane in an integral membrane suitable for use in reverse osmosis processes, are substantially avoided and overcome by a process for forming an integral membrane which comprises (1) subjecting at least one surface of a substantially unsized, fluid-permeable fabric comprising multiple substantially continuous warp and full multifilament strands of fiber-forming crystalline organic thermoplastic resin to high pressing forces at temperatures and pressures sufficient substantially completely to close permanently the interstices at the strand intersections while leaving the pressed fabric permeable to fluids, such as gas and desalinated water, and sufficient to smooth said surface(s) of the fabric to a high degree of smoothness, (2) cooling the pressed fabric to a temperature at least sufficiently cooler than the pressing temperature to set the fabric in its permanently pressed form, (3) casting onto a smooth surface of the fabric a concentrated polymeric, preferably cellulosic, film-forming dope, and (4) subjecting the dope on said fabric to subsequent steps of a known reverse osmosis membrane forming process. In particular, it has been found that the pressing of the unsized woven fabric of thermoplastic resin must be done under conditions of temperature and pressure sufficient to close as completely as practically possible the interstices in the fabric so that membrane ruptures will not occur at those parts of the fabric when the integral membrane is subjected to reverse osmosis membrane operating pressures, e.g. of 600 to 800 psig or higher, without, however, causing the filaments of the strands to fuse together to render the fabric impermeable, or to rupture from excessive pressure applied during pressing. The filaments thereby undergo sufficient plastic flow to cause the interstices to close. Simultaneously, under the conditions existing at the time of pressing, the surfaces of the fabric are rendered plastically flowable and can be pressed with a smoothing means to make one, or preferably both, flat surface(s) highly smooth, thereby reducing the dimensions of substantially all ridges and valleys in the faces of the fabric. Absence of the usual fabric stiffening or texturizing sizing from the fabric permits enhanced adherence of the cellulosic membrane composition to the support fabric and avoids interference with the membrane-forming process by the sizing. Because of the highly pressed and smoothed form of the membrane-facing surface of the support fabric, penetration of the surface of the fabric by the dope is minimal and permits the fabric to be used as a casting surface. No need for any filler material, such as melamine resin, discussed above, is found to exist.

The membrane layer of the resulting integral membrane can be made superthin in thickness and highly flexible while still providing a salt rejection capability and water flux rate which is the same or better than that previously obtained with a much thicker membrane (e.g. 4 to 5 times thicker) supported on an as-received D-601 fabric. The integral membrane made according to the process of this invention is particularly useful in a spiral-wound module for use in water desalination applications, because of its flexibility and the greater surface area of active membrane which can be compacted into the same module space formerly used.

DESCRIPTION OF THE PREFERRED EMBODIMENTS

The invention may be better understood from the following description. A polyester sailcloth fabric, woven D-601 fabric, was obtained in two forms. One form (referred to hereinafter as "Form A") was an as-received unsized fabric. The other form (referred to hereinafter as "Form B") was an unsized fabric, partly calendered by the supplier. A portion of the partly-calendered form was further calendered to a fully-calendered form (referred to hereinafter as "Form C") by passing it at about 1800 psig with 4 nip passes between rolls of a calendering mill which were heated to about 160°C. Upon examination of the three forms of fabric, under a microscope at 100X magnification, the characteristics shown in Table I were noted.

TABLE I

| Elements | Comparison of Appearances of Fabrics | | |
|---|---|---|---|
| | Form A | Form B | Form C |
| Filaments: | Closely spaced, cylindrical. | Closely spaced, somewhat flattened at crests of strands. | Closely spaced, well flattened on surfaces |
| Strands: | Spaced apart in warp and fill directions. | Closely packed in warp and fill directions. | Closely packed in all directions. |
| Openings at Interstices: | Large openings present at each intersection of warp and fill strands. | Small openings present at each intersection of warp and fill strands. | No openings visible. |

Figure 1:
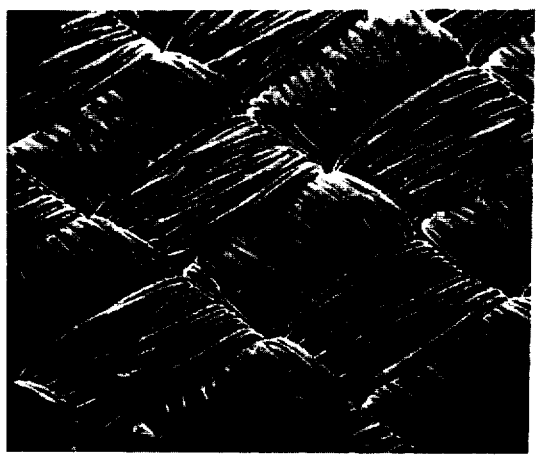
FIG. 1 is a scanning electron micrograph at a magnification of 100X of the pressed surface of a support member made according to the invention.
Figure 2:
FIG. 2 is an optical micrograph at a magnification of 135X of a cross section of a support member made according to the invention.
Figure 3:
FIG. 3 is a scanning electron micrograph at a magnification of 500X of the pressed surface of a strand of a support member made according to the invention.

The appearances of the filaments, strands and interstices of the fully-calendered D-601 fabric, Form C, are shown in the micrographs of the drawing. Referring to FIG. 1, it can be seen that the filaments of the fabric are closely-spaced, and well-flattened on the surfaces, that the strands are closely-spaced in all directions, and that no openings are visible at the interstices. FIG. 2, taken at 135X magnification, further shows the absence of openings at the interstices of warp and fill strands, as well as showing the comparatively smooth upper and lower surfaces of the fabric. FIG. 3, taken at 500X magnification further shows the flattened shapes of the individual filaments of the strands, as well as showing permeable spaces between adjacent filaments.

The fully-calendered fabric, Form C, can be used as a casting surface and support member for an integral membrane, as discussed above. The Form C fabric was found especially adapted for manufacture of commercially useful cellulosic reverse osmosis membranes of the integral type because of its tightness and thinness, and the fact that thinner layers of membrane can be applied to the fabric while still permitting desired high salt rejection rates and high water flux rates to be obtained. This novel feature of the Form C fabric makes it particularly useful for the manufacture of integral membranes for winding into spiral-wound modules. The overall thinness of the integral member made with the Form C fabric support member as well as the thinness of the membrane itself permits more surface area of active reverse osmosis membrane to be wrapped cylindrically or spirally and packed without damage into a unit of module space than was formerly generally possible with a fragile membrane, especially a cellulosic membrane made from a formic acidacetone solvent-containing dope.

The preparation of an integral membrane suitable for winding into a spiral-wound membrane of the type disclosed, for example, by Merten, above, and in U.S. Pat. No. 3,386,583, may be carried out with any of the concentrated dope compositions usually used in the art for forming a reverse osmosis membrane. The preferred concentrated dopes that can be used in the manufacture of the integral membrane of the present invention must contain, dissolved therein in the form of a clear, viscous solution, at least one film-forming cellulose ester, ether or mixed ester ether. The film-former(s) must be dissolved in an appropriate solvent blend which will vary to some extent in character depending upon the particular cellulosic material and poreproducing material that is utilized in the preparation of the desired dope composition. Thus, whereas it is preferred that the cellulosic film-forming material be a lower fatty acid ester of cellulose (in which the lower fatty acid ester groups contain from 2 to 5 carbon atoms) such as cellulose acetate, cellulose propionate, cellulose butyrate, cellulose acetate propionate, cellulose valerate, and cellulose acetate butyrate (and cellulose acetate is still further preferred), all having intrinsic viscosities of at least about 0.5 and degrees of substitution of at least about 2.2 ester groups, it is believed that filmforming cellulose ethers and mixed ether esters of cellulose that can dissolve to the extent of at least about 10 weight percent in the organic solvent fraction of the present dope compositions can also be used satisfactorily.

The cellulosic film-forming material(s) described above should comprise at least about 10 weight percent of the dope compositions and preferably should represent from about 15 to about 33 weight percent of the dope compositions. It is also preferred that the weight ratio of cellulosic filmformer to total organic solvent in these dopes be between about 1.2 and about 1.3, respectively. Other non-volatile material(s) can also be present in the dope compositions. The most noteworthy of such other than film-forming materials are the socalled "pore-producing materials". Pore-producing materials are well known in the reverse osmosis membrane manufacturing art and need not be treated exhaustively here, except by way of example to point out that this term includes such materials as magnesium perchlorate, inorganic iodides, bromides, salicylates, chlorates, tetraiodomercurates, thiocyanates, fluosilicates, effective amine salts of strong acids and even triphenyl boron, as well as other materials that are sufficiently soluble (to the extent of at least about 0.02 weight percent of usage temperatures) in the dope compositions. Such pore-producing materials function in their well-known capacity to, somehow, contribute to the overall effectiveness of the resulting membranes to function effectively in the reverse osmosis process.

Preferred pore-producing materials for use in the dope compositions for practice of this invention are the effective pore-producing amine salts of strong acids, as set out in detail in U.S. Pat. No. 3,522,335, issued to Martin E. Rowley on July 28, 1970 (the disclosure of which is incorporated herein by reference). Preferred pore-producing amine salts include the pore-producing hydrohalide, nitrate, sulfate, and phosphate salts or organic amines such as dipyridine sulfate, ditriethylammonium sulfate, ditriethanolammonium sulfate, triethanolamine phosphate, di(d-aminoethanol) sulfate, N,N-dimethylaniline sulfate and the like. Preferred amine sulfates are those in which the amine:sulfate equivalent ratio is about 2:1 respectively.

Other materials (preferably non-volative at 105°C. (221°F.)) such as plasticizers, antioxidants, surfactants, dyes and the like, can also be present in minor amounts dissolved in the dopes that are useful in the practice of the present invention. However, it is preferred that such materials constitute at most about 10 weight percent of the total nonvolatile fraction of such dopes, whereas the film-former(s) and pore-producing materials jointly constitute substantially all of the remainder. It is preferred, for example, that the poreproducing material be present at a level of at least about 0.02 and preferably at levels of from about 5 to about 35 weight percent, based upon the total weight of, e.g. cellulosic, filmforming material(s) in the dopes. Similarly, the weight ratio of cellulosic material(s) to total solvent material in these dopes can vary within a wide range, but preferably should be within the range of from about 1:2 to about 1:4, respectively.

In preferred embodiments of this invention, the preferred organic solvent fraction of the useful dopes contains at least an effective amount of formic acid. Such preferred organic solvent fractions are actually the subject matter of a copending patent application, Ser. No. 215,809, now U.S. Pat. No. 3,792,135, filed Jan. 6, 1972 in the name of Barry M. Brown. Its disclosure is hereby incorporated into the present patent application by reference. The dopes can also contain one or more additional volatile (below about 150°C. (302°F.) under ambient pressure) organic solvents in which the dope is soluble, but in which the support member is substantially insoluble, under the conditions of the membrane-forming process, such as acetone, methanol, ethanol, and the like. Such additional volatile organic solvent(s) should be miscible with water (> 100°F.) and be effective cosolvents (with acetic and/or formic acid) for the dissolution of the other essential components of the dope composition. It is preferred in the practice of the present invention to use blends of acetic and/or formic acid with acetone, preferred weight ratios being from about 20:80 to about 80:20, of acid: acetone, respectively. Water in minor amounts, preferably less than about 2 weight percent, can also be present in these dopes. Generally some water accompanies formic acid into dopes that contain this acid.

The amount of time the cast layer of the dope is "exposed" to the atmosphere (in step 2 of these processes) before it is quenched in the aqueous "initial quench" bath can be varied to some extent, as has been practiced heretofore in "exposure" steps in conventional reverse osmosis membrane manufacturing processes. Preferably, such exposure should be for at most about 120 seconds, which is just enough time for the "incipient" formation of the "active" layer, but not long enough to solidify the surface of the cast film. The temperature of the initial quench bath may range from about 34°F. to about 175°F. as taught in said copending patent application.

The initial aqueous "quench bath" into which the cast films are immersed after the short "development" step contains at least about 50 weight percent (preferably at least about 75 weight percent) of water, and can also contain relatively small amounts of the water miscible and water soluble components present in the dope compositions. They must have sufficient dissolving power to effectively extract at least half of the solvent(s) and pore-producing material(s) from the gelled membrane during the relatively brief period of time when the membrane remains immersed in the aqueous initial quench bath. Such brief period of time will depend upon such factors as the temperature of the bath, the speed at which the particular solvent(s) and other water soluble materials in the gelled dope composition can be extracted therefrom into the aqueous bath, as well as the extend of such extraction that is desired. Generally, the immersion time in the hot (e.g. 125° to 175°F.) "initial aqueous quench bath" should be at least about 5 second (subsequent washing and additional extraction can be undertaken at some later time and at lower temperatures, if desired), and will preferably be at least about 30 seconds to about 150 seconds, but can also be longer at less elevated temperatures.

In the practice of the initial casting step of the membrane-forming processes, generally, films of dope having thicknesses (after the membrane is formed) of from about 0.5 to about 20 mils can be cast on the casting and support member of this invention. However, preferable membrane thicknesses include those within the range of from about 0.5 to about 3 mils.

In the following examples, all parts given are by weight unless otherwise specified.

EXAMPLE 1

Dope Preparation

A. To 186.4 parts of formic acid (97+ %) are slowly added 94.0 parts of triethylamine with cooling. After the resulting mixture is cooled to about 20°C., 48 parts of 95 percent sulfuric acid are added slowly with agitation. The resulting stock solution of ditriethyl ammonium sulfate ("TEA" sulfate solution) (42% solids) is used in dope preparation.

B. Into 450 parts of a 60:40 (by weight) solvent mixture of formic acid and acetone are dissolved 150 parts of a commercial grade of cellulose acetate (containing 39.8 percent acetyl and 3.6 percent hydroxyl and having an "acetone" intrinsic viscosity of 1.15) and 55 parts of the TEA sulfate solution. The mixture is blended by tumbling until a smooth, clear solution is formed. The composition by weight of the dope solution is found to be about as follows:

| | |
|---|---|
| Formic acid | 46.2% |
| Cellulose acetate | 22.9% |
| Acetone | 27.4% |
| TEA sulfate | 3.5% |

Membrane Preparation

Dope solution made as described in paragraph "B", above, was coated, using conventional film-casting equipment, as a fluid film onto the smooth surface of a slowly moving continuous web of unsized, fully-calendered polyester sailcloth (D-601), described above as Form C fabric. The Form C fabric had a permeability to water flow of about 36,000 gal/ft$^2$/day at 600 psig. More particularly, a three-gallon stainless steel pressure vessel served as the dope solution reservoir. The vessel was connected to a variable speed pump arranged to transfer the dope solution to a 12 inch wide pressure dope solution hopper without dams and with a slot width of 15 mils. The clearance between the hopper blade and the casting surface of the sailcloth was set at one-sixteenth inch. The continuous web of fullycalendered sailcloth, having a thickness of about 3.3 mils, was passed beneath the dope solution hopper at a uniform rate using a variable speed system of idler rolls. The supply roll of sailcloth was equipped with a friction brake to allow for an even draw to the idler rolls. From the casting area, the cast film of membrane-forming dope and the sailcloth web on which it was cast were passed directly into a drying area where the film was exposed to unfiltered, non-turbulent air at 22°C. (71.6°F.), for 30 seconds. The resulting integral membrane, consisting of the membrane and its sailcloth support, was then immersed and quenched in a tank of warm water at 52°C. (125°F.) (as taught and claimed in the above-identified copending patent application). The quenched integral membrane was then rolled up using a torque-drive motor under controlled tension. The integral reverse osmosis membranes shown in FIGS. 4 and 5 were made substantially as described in this Example.

In manufacturing the continuous integral membrane, the thickness of the deposited film of membrane-forming dope may be regulated by control of the pressure in the dope solution hopper, the hopper blade setting, and the rate of travel of the sailcloth web by the hopper blade.

The particular combination of (i) formic acid usage in the dope, (ii) cellulose acetate being essentially the only film-forming component in the dope, (iii) use of the very high initial aqueous quench bath temperatures, and (iv) use of unsized, fully-calendered polyester sailcloth membrane support to form an integral membrane, in accordance with the practice of the present invention, results in the formation of unique, extremely valuable membranes which yield excellent "reverse osmosis" results, as shown in Table II.

Table II

| Integral Membrane Performance | | |
|---|---|---|
| Membrane Thickness Equilibrated (mils) | Desalination Characteristics | |
| | Flux (gal/ft$^2$/day) | % Salt Rejection |
| 0.5 | 40 | 95.6 |
| 2.0 | 36 | 96.0 |
| 6.0 | 35 | 96.8 |

The data in Table II were obtained by using integral membranes, made according to the procedure described above, to separate a NaCl feed solution containing 5000 ppm of NaCl by reverse osmosis into water and concentrated NaCl solution at 600 psig and a flow rate of 1200 ml per minute through a flow channel of 0.03 inch. The membrane thickness shown does not include the thickness of the support member.

Membrane Testing

A conventional desalination test apparatus was used in making the tests to obtain the data shown in Table II. Two-inch diameter samples of the integral membranes were tested. The "active layer" of each integral membrane was placed toward the feed solution and the membrane then was backed with a porous stainless steel plate channel member (mean pore diameter of 5 $\mu$). The feed solution was circulated through the test cell of the apparatus for sufficient time to flush out the product water system. The flux was determined by timing the volume of permeate flowing into a graduated cylinder while the rejection or extent of separation was determined by measuring the conductivity of the feed and product streams. The desalination parameters of the membranes are expressed as the percent salt rejection and product water flux (gal/ft$^2$/day). The percent salt rejection is calculated as follows:

$$\% \text{ salt rejection} = \frac{\text{salt content of product water}}{\text{salt content of feed}} \times 100$$

A major deficiency of cellulose acetate reverse osmosis membranes is their progressive decline in flux rate with time of operation. This decline is attributed generally to the plastic flow which a membrane undergoes under the high compressive stress, e.g. 600 psig, of the desalination cell operating pressure. The high pressure causes the porous, spongy substructure of the membrane below the "active" layer to compact and to become more resistant to flow of water. When, in addition, the support member of the membrane compacts and/or flows into the channel member, the combined effects greatly reduce the flux rate of the compacted integral membrane. The integral membrane of this invention has been found to have several unexpected advantages over prior art membranes with regard to the compaction problem.

The first of these advantages is that the integral cellulose acetate reverse osmosis membrane of the invention having the support member made from unsized, fully-calendered polyester sailcloth (Form C) has a membrane (only) thickness at substantially equivalent pressure resistance and equivalent flux and percent salt rejection which is greatly less than that of a membrane obtained with a support member which is unsized, partly-calendered sailcloth (Form B), or with a support member which is "as-received" uncalendered sailcloth (Form A), and about equivalent to that of an unsupported membrane of equal thickness.

A comparison of membrane thicknesses and their performances at similar pressure resistances of various membranes is shown in Table III. For test purposes, integral membranes having a Form A, B, or C fabric support member were all made according to the membrane preparation procedures described above. An unsupported membrane similarly was made by casting the same dope solution onto a belt of biaxially oriented poly(ethylene terephthalate) having a conventional hydrophilic copolymeric "sub" coating (as taught and claimed in U.S. Pat. No. 3,636,150). The cast film, after quenching, was removed from the belt as an unsupported membrane.

Test samples of the various reverse osmosis membranes of various thicknesses were subjected to desalination in a desalination test apparatus as described above. The object of the tests was to determine the thickness of equilibrated membrane in each category of membrane at which the highest level of salt rejection was obtained with acceptable flux rate. Time to equilibration is the term applied to define the time required for the salt rejection rate to reach a maximum. The membrane at such time is termed "equilibrated." The membrane thicknesses in the following discussion are equilibrated thicknesses unless otherwise noted.

It was found that due to the different degrees of compaction which occurred at equilibration among the different categories of supported membranes that the integral membrane supported by the uncalendered form of fabric required the thickest membrane and the membrane supported by the fully calendered form of fabric, i.e. that made according to the invention, required the thinnest membrane. Thus, it was found that at a salt rejection rating of 95.0 percent, an integral membrane made with an uncalendered sailcloth support member must have a membrane at least 5 mils in thickness to provide a flux of 41 gal/ft$^2$/day; an integral membrane made with a partly-calendered sailcloth support member must have a membrane at least 2.5 mils in thickness to provide a salt rejection of 97 percent at a flux of 33 gal/ft$^2$/day; whereas an integral membrane made with a fully-calendered sailcloth support member need have a membrane only about 1 mil in thickness to provide a salt rejection of 97 percent at a flux of 31 gal/ft$^2$/day.

It is to be noted in the Table III data that the performance of the non-supported membrane apparently is not significantly affected by the thickness of the membrane. This conclusion is based on the fact that the salt rejection and flux rates obtained with an unsupported membrane 6 mils in thickness are very little different from those obtained with an unsupported membrane having a thickness of only 0.5 mils. It may then be concluded that the compaction effect is related directly to the support member, and that the support member of the invention is significantly superior to the prior art forms of the support member used in the tests. In general, then, the tests show that an integral membrane including a woven fabric support member which is substantially completely free of interstices is the equivalent in performance, in terms of percentage of salt rejection and flux rates, of a membrane cast on a poreless surface, e.g. plastic sheet or glass at comparable thicknesses and that the more open the fabric (due to interstices openings) the greater than thickness of membrane required to give equivalent performance.

Table III

Performance of Membranes of Prior Thicknesses
At 600 psig Pressure Resistance

| Type Sailcloth Support | Support Thickness (mils) | Membrane Thickness Equilibrated (mils) | Operating Pressure, 600 psig | |
|---|---|---|---|---|
| | | | Flux gal/ft²/day | % Salt Rejection |
| None | | 0.5 | 42 | 96.5 |
| | | 2.0 | 42 | 96.2 |
| | | 6.0 | 40 | 97.0 |
| Uncalendered (Form A Fabric) | 5.0 | 3.0 | 65 | 57 |
| | 5.0 | 4.0 | 50 | 81 |
| | 5.0 | 5.0 | 41 | 95 |
| Partly-Calendered (Form B Fabric) | 3.4 | 1.0 | 170 | 0 |
| | 3.4 | 2.0 | 41 | 88 |
| | 3.4 | 2.5 | 33 | 97 |
| Fully-Calendered (Form C Fabric) | 3.3 | 0.25 | 60 | 75 |
| | 3.3 | 0.5 | 40 | 95.6 |
| | 3.3 | 1.0 | 31 | 97 |

Another effect of compaction is the time required for the membrane to equilibrate (i.e. for the salt rejection rate to reach a maximum) under cell operation conditions using a 5000 ppm NaCl feed solution at 600 psig. Table IV shows the test results obtained in terms of flux and percentage salt rejection when a comparison was made between an unsupported membrane and an integral membrane made according to the invention (reverse osmosis membrane with Form C support member). The membranes were prepared and tested substantially as described above. The unsupported membrane had an initial thickness of 6 mils and an equilibrated thickness of 2 mils. The membrane layer of the integral membrane had an initial thickness of 1.6 mils and an equilibrated thickness of 0.8 mils.

Table IV

Time Required to Reach Equilibration

| Hours | Unsupported Membrane | | Integral Membrane | |
|---|---|---|---|---|
| | Flux (gal/ft²/day) | % Salt Rejection | Flux (gal/ft²/day) | % Salt Rejection |
| 1 | 39 | 97 | 30 | 97.8 |
| 25 | 34 | 98 | 25 | 98.0 |
| 100 | 32 | 98 | 22 | 98.1 |
| 300 | 30 | 98.1 | — | — |
| 575 | 28.5 | 98.3 | 22 | 98.1 |
| 625 | 28.5 | 98.5 | — | — |
| 660 | 28.0 | 98.5 | — | — |

From the data in Table IV, it is seen that the integral membrane required only between 25 and 100 hours to reach equilibration whereas the unsupported membrane required from 575 to 625 hours to reach equilibration. The thinner integral membrane of the invention, thus, is seen to equilibrate much more rapidly to a stable operating condition, which is an important consideration in desalination apparatus operation. While the differences in times to reach equilibration is apparently due partly to the differences in initial thicknesses of the cast membranes, it is seen that after about 30 percent loss in initial flux and a slight gain in salt rejection, each of the membranes is resistant to further compaction and reaches equilibration.

EXAMPLE 2

A 12 inch wide continuous integral membrane was made and tested in accordance with the procedures described in Example 1, above, and found to have a salt rejection of 96 percent and a flux of 27.5 gal/ft²/day at 600 psig. Several pieces of the integral membrane, each measuring about 5 ft.² in total area, were wound to make spirally wound modules of the Merten type discussed above for use in a desalination unit. The integral membrane was found to handle very well in the winding operation. On start-up of the unit, the integral membrane had a low salt rejection rate and a very high flux. However, after about 4 to 8 hours of operation, the salt rejection rate had increased and the flux rate had decreased to the above-rated acceptable plant operating levels.

The invention has been illustrated with a woven, sailcloth form of polyester (Dacron D-601) fabric. However, it is to be understood that the advantages of the invention can also be obtained by use as the support member of the integral membrane of other unsized fabrics made of continuous multiple warp and fill multifilament strands of organic thermoplastic resin, preferably of crystalline form, which can be pressed, by calendering or other pressing means, at temperatures and pressures sufficient to smooth at least one surface, preferably both, of the fabric to a high degree of smoothness and substantially completely to close permanently the interstices at the strand intersections while leaving the pressed fabric permeable to the passage of substantially desalinated water at reverse osmosis cell operation pressures. Preferably, the organic thermoplastic material will be a biaxially-oriented, heat set polyester or polyolefin, e.g. high density (0.94 to 0.97 g/cc) polyethylene or polypropylene or mixtures thereof. Most preferably, the polyester will be a fiber-forming crystalline linear polyester resin having recurring cyclic structure in the polymer backbone, preferably one made by condensing a glycol with a lower dialkyl ester of a dicarboxylic acid, e.g. poly(ethylene terephthalate) having a brittle temperature point above about 135°C., and an intrinsic viscosity in phenol:chlorobenzene in about 60:40 weight ratio of from about 0.2 to about 1.3 deciliters per gram determined at about 25°C. in a solution containing about 0.5 gram of polymer per 100 milliliters of phenol:chlorobenzene. Other fiber-forming polyesters advantageously also may be employed, particularly those in which one component of the recurring unit in the polyester chain is derived from terephthalic acid, diphenyl methane p,p'dicarboxylic acid, diphenol p,p'dicarboxylic acid, diphenyl ethane p,p'dicarboxylic acid, or naphthalene dicarboxylic acids such as napthalene 2,6-and naphthalene-2,7-dicarboxylic acids.

Various aliphatic glycols, generally those having 2–4 carbons and preferably the trans and cis isomers of 1–4 cyclohexane dimethanol can be reacted with the indicated diacids to form polyesters useful in fiber form in practicing this invention. Block and random copolymers of these same materials can be employed. Examples of such polyesters are poly(1,4-cyclohexylenedimethylene terephthalate), poly(ethylene isophthalate), poly(tetramethylene terephthalate), poly(ethylene naphthalenedicarboxylate). Mixtures of two or more crystalline fiber-forming polymers such as the polyesters can be used for practice of the invention.

Methods for obtaining fiber-forming polyesters having the desired crystallinity, which renders the polymer moldable and flowable as required for practice of this invention, are well known in the polymer manufacturing art. See, for example, U.S. Pat. Nos. 3,544,525; 3,497,477; and 3,104,011. Polyesters of the group described above which are brittle in the temperature range of about 135° to 315°C. and which have low intrinsic viscosities, e.g. 0.38 to 0.62, when melted are preferably used in practicing this invention.

The Dacron 601 sailcloth used in illustrating the invention has the following specifications:

| | |
|---|---|
| Finished construction | 124 × 73 |
| Warp | 70/34 Dacron |
| Filling | 70/34 Dacron |
| Single Warp | 4.0 "Z" TPI |
| Filling 2 ply | 3.0 "Z" TPI in ply |
| Weight | 2.63 oz./yd.$^2$ |
| Weave | plain |
| Air permeability | (flow of air in cubic feet per minute per sq. ft.): Form A — Over 30 Form B — About 3.5 to 5 Form C — — 0.5 to 1.5 |

The form of weave of the fabric is not critical to practice of the invention except that the warp and fill strands in the fabric must be closely woven to minimize the size of the interstices which must be closed. The strands preferably should contain a multiplicity of smooth filaments which may be of cylindrical, rectangular or of any other cross-sectional form to make the pressed fabric permeable to water. It is critical, however, that the thermoplastic resin fabric must be capable of being permanently pressed at temperatures preferably below its melting point to permit the interstices at warp and fill intersections to be substantially completely closed while the fabric is left in a fluid-permeable condition.

Also, other concentrated polymeric casting dopes than the cellulosic dopes disclosed in the Example may be used to form the membrane portion of the integral membrane of the invention, provided only that the solvents used in the dope do not attack the support member. Examples of such polymeric dopes will be known to those skilled in the art and include, for example, dopes of polysulfones and polyesters. Furthermore, other membrane-forming processes known in the art may be used to form the membrane on the support member in a continuous or discontinuous form of the membrane support of this invention.

While the Form C fabric made according to the invention is intended primarily to be used as a support member for a reverse osmosis membrane, it will be understood by those skilled in the arts that the fabric can be used advantageously for filtration purposes of many types where a permeable fabric is needed. The integral membrane of the invention will also be found useful for a wide variety of ultrafiltration applications such as are involved in biological or pharmaceutical separations, protein concentration, sewage treatment, water clarification, sugar purification, and the like and in analytical procedures.

Figure 4:
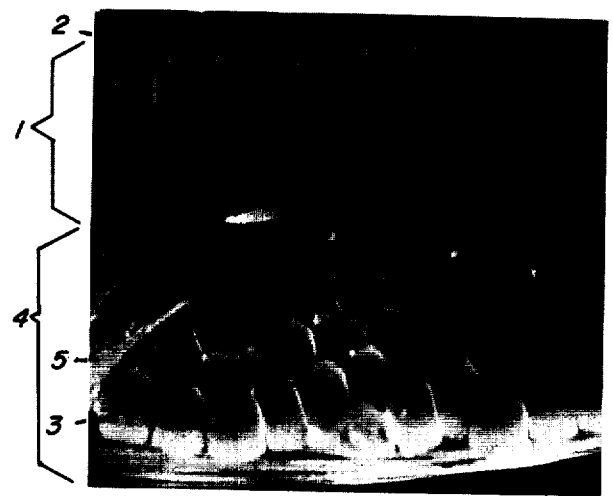
FIG. 4 is a scanning electron micrograph at a magnification of 500X of a cross section of an integral reverse osmosis membrane made according to the invention and taken before compaction.
Figure 5:
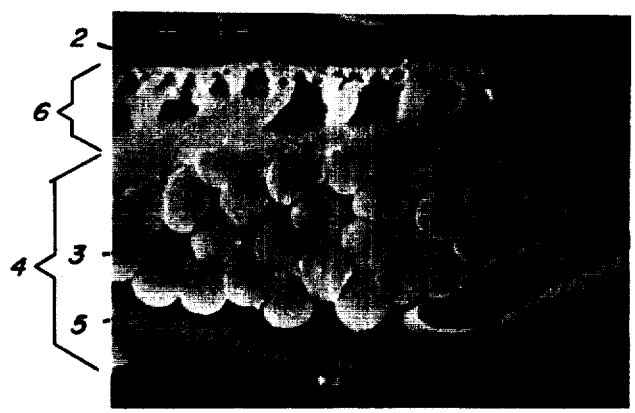
FIG. 5 is a scanning electron micrograph at a magnification of 500X of a cross section of an integral reverse osmosis membrane made according to the invention and taken after compaction during use in a desalination cell.

In the integral membrane of FIG. 4, 1 is a noncompacted reverse osmosis membrane; 2 is the active surface of the membrane; 3 is a cross-section of an end view of a strand filament of the pressed support 4; and 5 is a side view of a strand filament of the pressed support. In the integral membrane of FIG. 5, 6 is a compacted reverse osmosis membrane as it appeared after about 60 hours of operation of the integral membrane in a NaCl desalination test cell at 600 psig according to the procedure described above under the heading "Membrane Testing" in Example 1; and 2, 3, 4 and 5 are the same as in FIG. 4.

The invention has been described in detail with particular reference to preferred embodiments thereof, but it will be understood that variations and modifications can be effected within the spirit and scope of the invention to obtain the advantages thereof.

We claim:

1. In a process for manufacturing semi-permeable integral cellulosic film membranes suitable for use in reverse osmosis processes, which process comprises the steps of
   a. casting in the form of a film a concentrated cellulosic dope onto an elongated, permeable, casting and membrane support fabric;
   b. exposing said film to a gaseous atmosphere for a sufficient period of time to develop an incipient active layer at the surface of the resulting partially evaporated layer of dope exposed to said gaseous atmosphere;
   c. thereafter diverting the elongated fabric on which is coated said layer of dope into water to thereby cause said partially evaporated layer of dope to gel and form a wet membrane; and
   d. thereafter removing the resulting wet membrane and fabric from said bath as a substantially nonseparable semipermeable laminate, said concentrated dope being comprised of a blend of at least one cellulosic film-former selected from the group consisting of soluble film-forming cellulose esters, ethers and mixed ester ethers and at least one pore-producing material; said blend being dissolved in a volatile, water miscible solvent portion in which said fabric is insoluble;
   the improvement therein being where the fabric comprises substantially unsized warp and fill strands of substantially continuous multifilaments of fiber-forming crystalline organic thermoplastic resin, said fabric being heat pressed to render it substantially completely free of interstices at the strand intersections, and the solvent consists essentially of an effective amount of acetic acid, formic acid, or a mixture of acetic and formic acids.

2. A process according to claim 1 wherein the resin is a polyester or polyolefin.

3. A process according to claim 2 wherein the polyester is poly(ethylene terephthalate).

4. The process according to claim 3 wherein the fabric is a polyester sailcloth pressed by calendering at a temperature of at least about 325°F. and a pressure of at least about 1800 psig.

5. The process according to claim 1 wherein said cellulosic film-former and said pore-producing material are present in said dope in an amount equal to at least about 10 weight percent and at least about 0.2 weight percent, respectively.

* * * * *

UNITED STATES PATENT OFFICE
CERTIFICATE OF CORRECTION

PATENT NO. : 3,894,166
DATED : July 8, 1975
INVENTOR(S) : Barry M. Brown and Walter D. Slowig It is certified that error appears in the above-identified patent and that said Letters Patent are hereby corrected as shown below:

Column 1, line 51, "3,334,214" should be -- 3,343,214 --.

Column 8, line 18, "or" should be -- of --.

Signed and Sealed this twenty-third Day of March 1976

[SEAL]

Attest:

RUTH C. MASON
Attesting Officer

C. MARSHALL DANN
Commissioner of Patents and Trademarks